US011080097B1

(12) United States Patent
Panghal et al.

(10) Patent No.: US 11,080,097 B1
(45) Date of Patent: Aug. 3, 2021

(54) USER DEFINED LOGICAL SPREAD PLACEMENT GROUPS FOR COMPUTING RESOURCES WITHIN A COMPUTING ENVIRONMENT

(71) Applicant: Amazon Technologies, Inc., Seattle, WA (US)

(72) Inventors: Vikas Panghal, Seattle, WA (US); Alan Hadley Goodman, Issaquah, WA (US); André Mostert, Cape Town (ZA); Stig Manning, Cape Town (ZA); Joshua Dawie Mentz, Cape Town (ZA); Gustav Karl Mauer, Bellville (ZA); Marnus Freeman, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 15/608,919

(22) Filed: May 30, 2017

(51) Int. Cl.
G06F 9/50 (2006.01)
G06F 9/48 (2006.01)
G06F 9/46 (2006.01)
G06F 9/445 (2018.01)

(52) U.S. Cl.
CPC .............. G06F 9/5077 (2013.01); G06F 9/48 (2013.01); G06F 9/5005 (2013.01); G06F 9/44505 (2013.01); G06F 9/463 (2013.01)

(58) Field of Classification Search
None
See application file for complete search history.

(56) References Cited

U.S. PATENT DOCUMENTS

| 7,624,240 | B1 * | 11/2009 | Colbert | G06F 9/4856 711/159 |
| 2009/0070771 | A1 * | 3/2009 | Yuyitung | G06Q 10/06 718/105 |
| 2009/0150896 | A1 * | 6/2009 | Tsushima | G06F 9/45541 718/104 |
| 2010/0250744 | A1 * | 9/2010 | Hadad | G06F 9/4856 709/226 |
| 2011/0213911 | A1 * | 9/2011 | Eidus | G06F 9/4856 711/6 |
| 2012/0096461 | A1 * | 4/2012 | Goswami | G06F 9/45558 718/1 |
| 2012/0324070 | A1 * | 12/2012 | Campion | G06F 9/5066 709/223 |
| 2013/0132545 | A1 * | 5/2013 | Schultze | H04L 41/00 709/223 |
| 2013/0227558 | A1 * | 8/2013 | Du | G06F 9/45558 718/1 |

(Continued)

Primary Examiner — Meng Ai T An
Assistant Examiner — Zujia Xu
(74) Attorney, Agent, or Firm — Davis Wright Tremaine LLP

(57) ABSTRACT

Customers of a computing resource service provider may transmit requests to instantiate compute instances associated with a plurality of logical partitions. The compute instances may be executed by a server computer system associated with a particular logical partition of the plurality of logical partitions. For example, a compute service may determine a set of server computer systems that are capable of executing the compute instance based at least in part on placement information and/or a diversity constraint of the plurality of logical partitions.

20 Claims, 10 Drawing Sheets

(56) References Cited

U.S. PATENT DOCUMENTS

| | | | |
|---|---|---|---|
| 2013/0318215 A1* | 11/2013 | Tajima | H04L 41/08 709/220 |
| 2014/0026133 A1* | 1/2014 | Parker | G06F 9/5083 718/1 |
| 2014/0337834 A1* | 11/2014 | Adogla | G06F 9/45558 718/1 |
| 2015/0067168 A1* | 3/2015 | Hegdal | G06F 9/5077 709/226 |
| 2015/0146250 A1* | 5/2015 | Okada | H04N 1/00087 358/1.15 |
| 2015/0220670 A1* | 8/2015 | Linehan | G05B 13/04 705/26.63 |
| 2015/0324236 A1* | 11/2015 | Gopalan | G06F 11/1453 711/162 |
| 2017/0097845 A1* | 4/2017 | Kouznetsov | G06F 9/45558 |
| 2018/0074840 A1* | 3/2018 | Chai | G06F 9/45558 |

* cited by examiner

USER DEFINED LOGICAL SPREAD PLACEMENT GROUPS FOR COMPUTING RESOURCES WITHIN A COMPUTING ENVIRONMENT

BACKGROUND

To facilitate the utilization of data center resources, virtualization technologies may allow a single physical computer system to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are frequently shared between customers. In addition, these computing resources are often leveraged in large-scale networks of computers, servers and storage drives to enable clients, including content providers, online retailers, customers and the like, to host and execute a variety of applications and web services. The usage of network computing allows content providers and customers, among others, to efficiently and adaptively satisfy their computing needs. However, in these large distributed computing systems customers may have little to no control of the placement of their virtual machines within physical computer systems.

BRIEF DESCRIPTION OF THE DRAWINGS

Various techniques will be described with reference to the drawings, in which.

DETAILED DESCRIPTION

Figure 1:
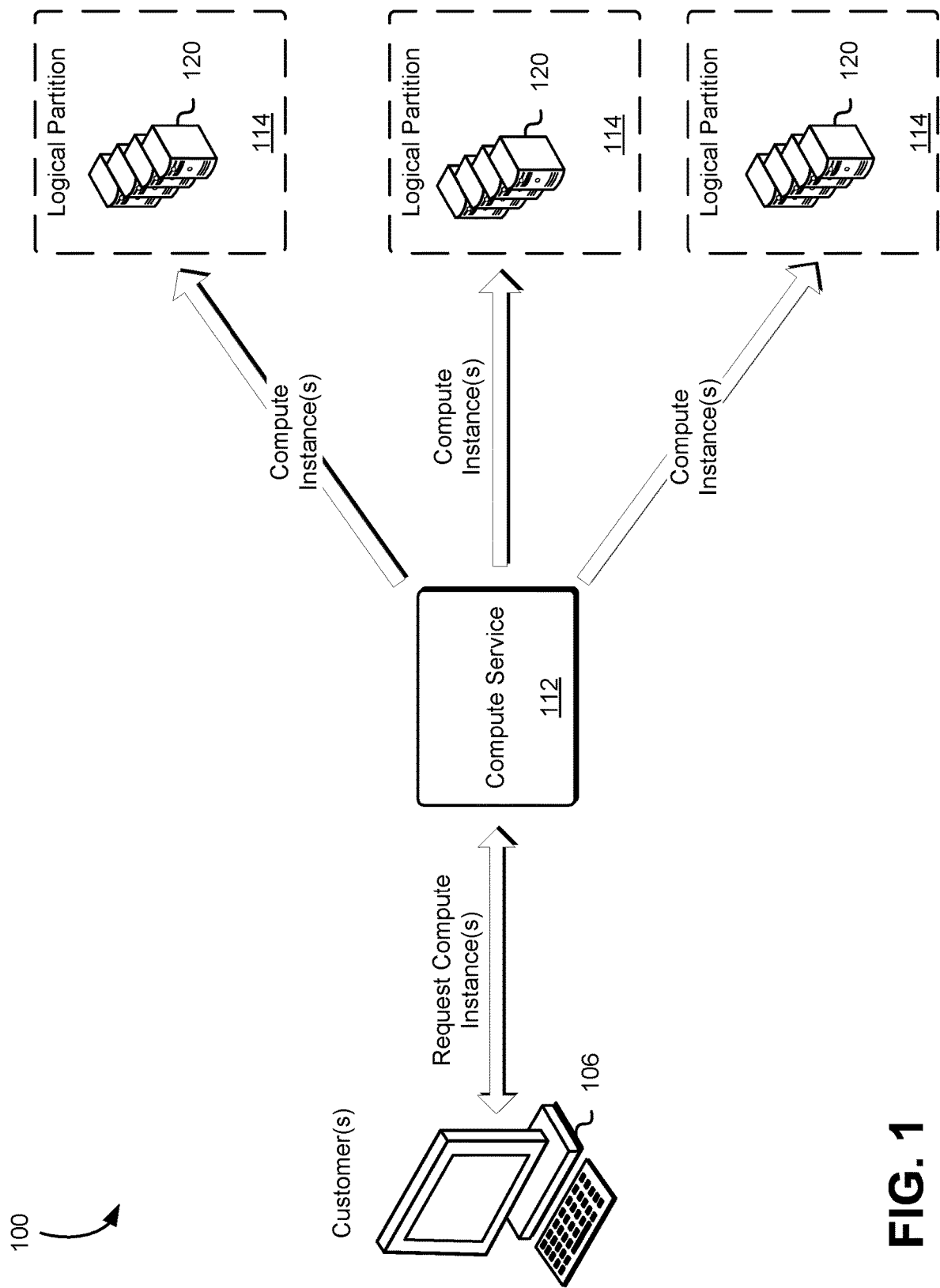
FIG. 1 illustrates an environment in which a compute service places compute instances operated by a customer in a plurality of logical partitions according to a placement strategy in accordance with an embodiment.

In various examples, a customer of a computing resource service provider operates compute instances using computing resources such as physical computer systems provided by the computing resource service provider. The customer may, through an application programming interface (API), request that compute instances operated by the customer are distributed among a plurality of logical partitions of the computing resources of the computer resource service provider. In some embodiments, compute instances are placed into logical partitions of host computer systems by a compute service of the computing resource service provider, taking into account a number of parameters such as geographic location, power, cooling, maintenance, network latency, throughput, network location, and other factors.

In some cases, the customer requests a plurality of compute instances to be instantiated into the plurality of logical partitions to accomplish a particular goal (e.g., avoiding a single point of failure that, if fails, causes a plurality of customer compute instances to fail, ensuring data redundancy, reduce network latency, increase throughput, etc.). The logical partitions may divide or otherwise distribute the physical computing resources of the computing resource service provider along various diversity components such as top of rack switches, routers, storage devices, hardware security modules, graphics adaptor, attached devices, server computers, back-up power generator, or other computing resources of the computing resource service provider. In one example, customer operated compute instances are distributed among logical partitions determined based at least in part on a network diversity constraint such that each of the computing resources assigned to each logical partition are on different networks. The logical partitions, in this example, may result in the compute instances being executed within a particular logical partition to be on a different network from compute instances executed with a different logical partition. This may provide the customer with highly available compute instances because if a particular network becomes unreachable of any reason, compute instances on another network may still be accessible. Other examples of diversity constraints and/or diversity components between partitions and the benefits of different diversity constraints and/or diversity components are described in greater detail below. For example, a diversity constraint indicates a set of hardware-based conditions for hosting the plurality of logical partitions to prevent a hardware failure from disabling multiple partitions of the plurality of partitions.

In various embodiments, the compute service may respond to a request to launch the compute instances by selecting host computer systems on which to instantiate the compute instances on behalf of the customer. In some situations, the resulting placement of compute instances may include a portion of the customer's compute instances being executed on the same host computer system, on different host computers that are connected to a common switch, or in other placement configurations for which the customer's compute instances share a point of failure. For example, if two or more of the customer's compute instances are launched on the same host computer system, all of the compute instances will become non-operational if the host computer system on which they are executing becomes non-operational. In another example, the customer's compute instances may be placed on different host computers within a rack of host computer systems that are connected to the same switch. A failure of that particular switch may render the compute instances unable to send or receive network traffic over the shared failed switch. To avoid such scenarios the compute service may track placement information, for example, in a placement database or other data store as described in greater detail below. This placement information may enable the compute service to monitor the placement of the customer's compute instances across different host computer systems and/or other computing resources of the computing resource service provider so that the compute service may determine a plurality of logical partitions to avoid one or more points of failure.

As described in greater detail below, placement engine or other component of the compute service may generate a plurality of logical partitions on behalf of the customer. These logical partitions, in various embodiments, provide computing resources diversity for the compute instances executed within the logical partition. Furthermore, these logical partitions may be generated as the customer requests compute instances or compute instances are otherwise added, such as during auto-scaling operations. This enables the customer to request a plurality of logical partitions and to later add additional compute instances and/or additional logical partitions. In addition, the customer may have multiple groups of compute instances as well as multiple logical partitions organized in a hierarchical structure. For example, the customer has a first group of compute instances to execute a web service frontend and a second group of compute instances to execute a database. On top of this, the customer may specify a hierarchy of logical partition within which the first and the second group of compute instances are to be executed. The hierarchy of logical partition may include a plurality of logical partitions organized such that the first group of compute instances are distributed across different networks, the second group of compute instances are clustered around a single switch (e.g., to enable low latency communication between database components), and both the first and the second group of compute instances are distributed between back-up power generators. This type of logical partition allows customers to intelligently design and implement applications and services executed by computing resources of the computing resource service provider on behalf of the customer.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a customer 106 may transmit a request to a compute service 112 to instantiate a group compute instance 120 operated by the customer 106 among a plurality of logical partitions 114 in accordance with an embodiment. The compute service 112, described in greater detail below, may be provided to the customer 106 by a computing resource service provider. In addition, the compute service 112, in an embodiment, allows the customer 106 to interact with and otherwise operate compute instances 120 supported by computing resources of the computing resource service provider. The computing resource service provider may provide a variety of services to the customer 106, and the customer 106 may communicate with the computing resource service provider through service calls transmitted over a network to an interface (not shown in FIG. 1), which may be a web service interface or any other type of customer interface. Although only the compute service 112 is shown in FIG. 1, the computing resource service provider may provide a variety of services to the customer 106. Furthermore, each service may have its own interface and, generally, subsets of the services may have corresponding interfaces in addition to or as an alternative to a single interface for the computing resource service provider.

In an embodiment, the customer 106 is an organization that may utilize one or more of the services provided by the computing resource service provider to maintain and deliver information and/or applications (e.g., services) to various entities, which may be located in various geographical locations. In yet other embodiments, the customer 106 includes individuals who utilize the services of the computing resource service provider for remote application execution. In general, the customer 106 may include a variety of different entities including individuals, organizations, departments, work groups, service providers, computing resource providers, applications, services, computer systems, micro services, or anything else capable of requesting a placement group. The customer 106 may communicate with the computing resource service provider through a network such as the Internet, an intranet or an Internet service provider (ISP) network. Some communications from the customer 106 to the computing resource service provider may cause the computing resource service provider to operate in accordance with one or more embodiments described in the present disclosure. For example, the customer 106 sends a request to the compute service 112 to provision a group of compute instances 120 to execute an application on behalf of the customer 106, the request indicating that the group of compute instances 120 is to be distributed among a plurality of logical partitions 114. In another example, the customer 106 sends a request to the compute service 112 for a compute instance 120, the request indicating that the compute instance 120 is to be instantiated within a particular logical partition of the plurality of logical partitions 114.

Accordingly, at least a portion of the communications from the customer 106 may include requests that cause the computing resource service provider or component thereof, such as the compute service 112, to perform various operations to instantiate compute instances 120 on computing resources distributed among a plurality of logical partitions 114 based at least in part on a diversity constraint. For example, the customer 106 may provide the compute service 112 with an application programming interface (API) call to instantiate a set of compute instances 120 to be distributed among the plurality of logical partitions 114 where computing resources of each partition is separated by a top of rack switch (e.g., no two computing resources of distinct logical partitions are connected to the same top of rack switch). Furthermore, the API call may include one or more diversity constraints (e.g., top of rack switch, storage device, or power grid) or placement strategy (e.g., evenly distributed or clustered) for distributing compute instances 120 among the plurality of logical partitions 114.

As described in greater detail below, the compute service 112 may cause host computer systems (e.g., server computer systems) to execute the instances 120 in response to requests from the customer 106. In addition, these host computer systems may execute a plurality of instances operated by a plurality of customers to enable the computing resource service provider to leverage the host computer systems and service a large number of customers with varying requirements and workloads. As described above, certain placements of compute instances 120 on these host computer systems may create a point of failure that the customer 106 may find undesirable. The logical partitions 114, in various embodiments, provide a mechanism for the customer 106 to define a placement strategy the customer finds more desirable. In addition, the customer 106 may have a plurality of groups of compute instances 120, each group of compute instances of the plurality of groups distributed among its own plurality of logical partitions 114. Furthermore, at least some of the compute instances 120 of the plurality of groups of compute instances 120 may overlap in certain logical partitions. For example, partition 1 of a database group may be executed by the same computing resources as a webserver executed in partition 3 of a webserver group.

The compute instances 120 within and/or between the plurality of logical partitions 114 may be distributed in accordance with various placement strategies. In various embodiments, the compute instances 120 within a particular partition are clustered in accordance with a clustering algorithm such that the compute instances 120 as much as possible are executed by the same host computer system or connected to the same network application. In yet other embodiments, the compute instances 120 within a particular partition are evenly distributed in accordance with a placement strategy such that the compute instances as much as possible are executed by different host computer systems. A variety of algorithms defining a distribution pattern of compute instances 120 within and/or between logical partitions of the plurality of logical partitions 114 is considered within the scope of the present disclosure. As described above, the customer 106 may define the diversity constraint used to define the logical boundaries of the plurality of logical partitions. For example, the customer 106 defines storage redundancy as a diversity constraint, the compute service 112 then generates the plurality of logical partitions 114 such that each partition contains a copy of the customer data (e.g., each partition contains at least one storage device or other computing resources supporting the customer's 106 logical volume or other storage location). The compute service 112 or component thereof, such as a placement engine, as described in greater detail below, when provisioning compute instances 120 avoids placement of the compute instance 120 within a particular host computer system.

Figure 2:
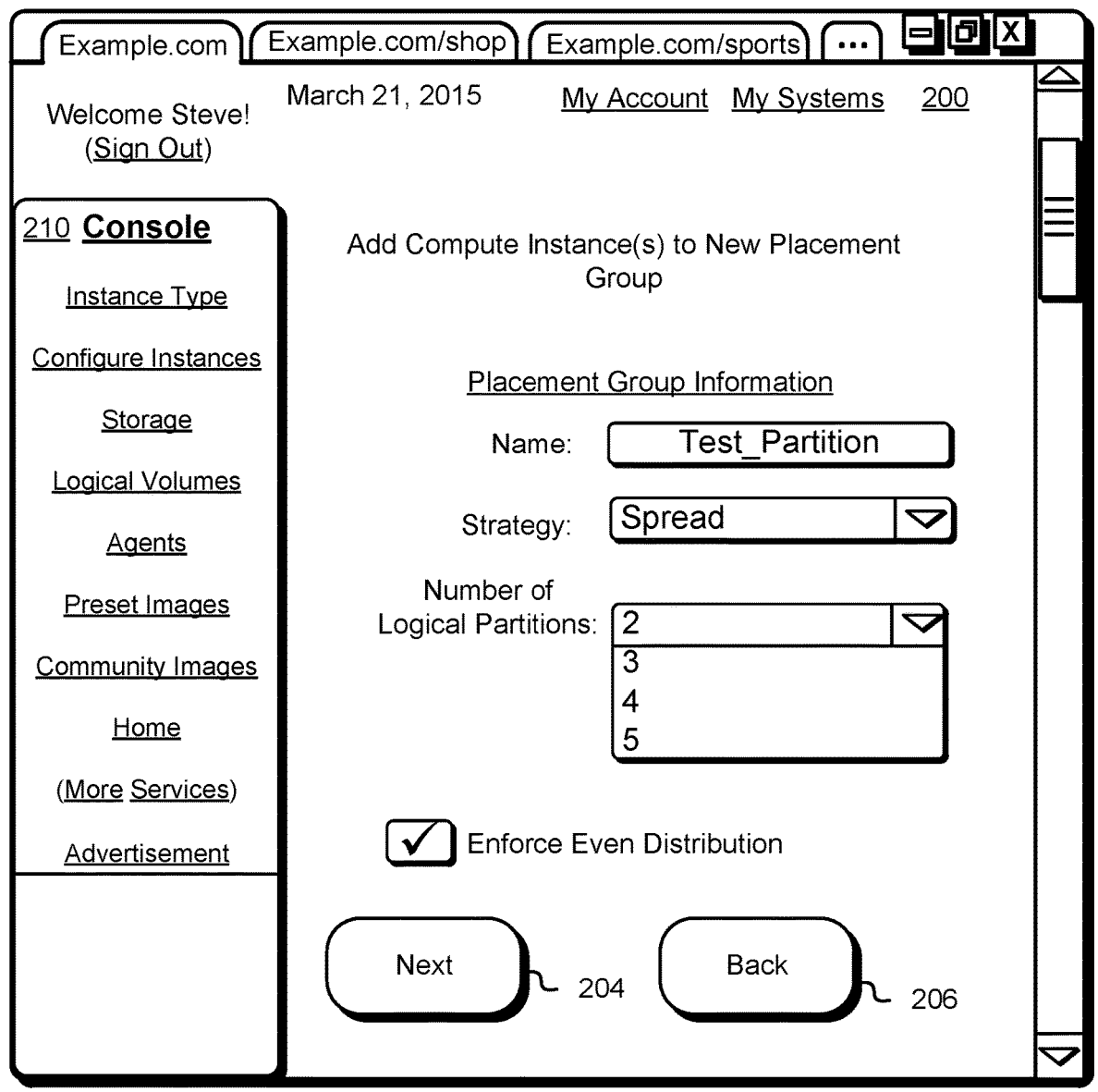
FIG. 2 is a diagram illustrating a management console exposed as a webpage enabling customers to distribute customer operated compute instances among a plurality of logical partitions in accordance with at least one embodiment.

FIG. 2 shows a webpage 200 which may be displayed by an application executed by a computing system enabling a user to interact with a compute service operated by the computing resource service provider in accordance with an embodiment. As illustrated in FIG. 2, the webpage 200 includes various graphical user interface elements that enable customers to indicate information associated with the provisioning and distribution of compute instances provided by the compute service using computing resources of the computing resource service provider through a management console of which the webpage 200 is a part. In various embodiments, the user interacts with the compute service by issuing commands through the management console. The webpage 200 may be displayed by various applications, such as a mobile application or web browser. In this example, the webpage 200 includes various navigational features.

For instance, on the left-hand side of the webpage 200, various links 210 may link to one or more other webpages that contain additional content corresponding to a variety of different actions the user may cause to be performed. For example, the link "Configure Instances," when selected by the customer using an input device, causes the computing device displaying the webpage 200 to transmit a request for a webpage associated with the link. As described in greater detail below, the customer, through the management console, may interact with the compute service to perform a variety of operations such as defining a number of logical partitions, a number of compute instance groups, placing compute instances within particular logical partitions, moving compute instances from one partition to another, or any other operation to create, modify, or delete compute instances and/or logical partitions. For example, as illustrated at FIG. 2, a number of logical partitions for a group of compute instance may be selected from a drop down list. As a result of selecting the number of logical partitions from the drop down list the compute service may create the number of logical partitions indicated in the drop down list.

The console web pages may correspond to operations that may be taken to manage or otherwise control computer system instances of various types and various logical partitions provided by the compute service or other computing services of the computing resource service provider. In this example, the links appear as textual words which enable the links to be selected using an appropriate input device such as a keyboard, mouse, touchscreen or other input device. Selection of one of the links 210 may cause an application displaying the webpage 200 to submit, pursuant to a Uniform Resource Locator (URL) associated with the selected link by the programming of the webpage 200, a request, such as an HTTP request, for the content associated with the link to a server that provided the webpage 200 or another server.

In this example, the webpage 200 also includes a graphical user element configured as a "next" button 204. The next button 204 may be a graphical user interface element of the webpage 200 where the underlying code of the webpage 200 is configured such that selection by an input device of the next button 204 causes information corresponding to the selection of a particular behavior selected on the webpage 200 to be transmitted to the compute service. Furthermore, through the management console, the user may be guided through the process of selecting various diversity constraints, logical partition information, and/or compute instance information associated with execution of the group of compute instances. The process may be divided into steps and the user may be prompted to provide information at each step. For example, the webpage 200 displays to the user a list of different types of computing system instances suitable for executing the customer workload or application and one or more diversity constraints desired by the customer.

In various embodiments, webpage 200 is displayed as part of a process enabling the customer, using an input device, to select a set of compute instances to execute the customer workload, application, or other operations indicated by the customer. Additionally, the customer may indicate a preference for executing the set of compute instances with a particular number of logical partitions and a particular placement strategy. For example, as described above and illustrated in FIG. 1, the set of compute instances may be instantiated on computing resources distributed among a number of logical partitions based at least in part on a diversity constraint. The user selection may be stored until the entire process is completed, or the user selection may be transmitted to the compute service upon selection of a graphical user interface element.

As illustrated in FIG. 2, the webpage 200 may contain a graphical user interface element displayed as a check box to enable the user to select various options such as enforcing an even distribution of compute instances within the logical partitions and adding the compute instances to either a new or existing placement group (e.g., a plurality of logical partitions include a number of compute instances). In an embodiment, the customer has the option to cause the compute service to enforce even distribution of the set of compute instances within the logical partitions. For example, if a particular set of compute instances contained twelve compute instances and the customer select three logical partitions with even distribution selected, compute service will provision the particular set of compute instances such that each logical partition contains four compute instances. Enforcing an even distribution causes the compute service to maintain a set of conditions on the number of instance in a partition based at least in part on the number of instances in the logical partition to result in a limit on the difference between the number of instances between pairs of partitions. For example, if there are eleven compute instances and five logical partitions, the set of conditions may ensure that each partition has two compute instances but for one logical partition that contains three compute instances. In some embodiments, the compute service prevents compute instances from being added to logical partitions if a result of adding the compute instance would violate the set of conditions. In yet other embodiments, the compute service may enforce the set of conditions such that the difference between the number of compute instances in a pair of partitions is valid relative to a threshold value.

The webpage 200 may also include a graphical user element configured as a "back" button 206. The back button 206 may be a graphical user interface element of the webpage 200 where the underlying code of the webpage 200 causes the application displaying the webpage 200 to transmit a command to the computing systems to return to a previously navigated webpage of the management console. In this example, the webpage 200 contains a prompt asking the customer to select various options of a set of compute instances and plurality of logical partitions (e.g., placement group). The selected options may be used to provision the set of compute instances on various computing resources distributed across the plurality of logical partitions by the compute service.

Once the user has made a selection using the webpage 200 and selected the next button 204, the application displaying the webpage 200 may submit a request, such as an HTTP request, to the compute service to provision the set of compute instances as indicated by the customer using the options displayed in webpage 200. In various embodiments, the compute service maintains placement information indicating various attributes of computing resources, various compute instances assigned to particular computing resources, and various computing resources assigned to logical partitions. The request may be transmitted to one or more servers of the compute service operated by the computing resource service provider. Furthermore, the compute service may obtain additional information from one or more other services in order to complete the request from the user. For example, the compute service may obtain auto scaling and/or load balancing information from an auto-scale service and/or load balancing service as described in greater detail below. Alternatively, once the user selection has been made using the webpage 200 and selected the next button 204, the application displaying the webpage 200 may submit a request, such as an HTTP request, to a web service frontend or other interface that may translate the request to an service call or API command and forward the command to the compute service.

The compute service may, in response to the customer selecting the next button 204 with an input device, instantiate a group of compute instances according to various selected options. In various embodiments, the compute service or other service of the computing resource service provider returns in response to the request, such as an HTTP request, from the customer, an indication that the set of compute instances has been instantiated within a plurality of logical partitions in accordance with the options selected by the customer. In other embodiments, the response to the request may indicate that the set of compute instances currently executing and/or operated by the customer has been modified in accordance with the options selected by the customer. In yet other embodiments, the response to the request may indicate that the set of compute instances was not modified in accordance with the options selected by the customer, for example, because there are insufficient computing resources available satisfying the diversity constrained and/or options selected by the customer. In another example, the compute service may transmit a notification in response to the request indicating that a compute instance could not be added because the addition would cause the partition to become unbalanced and the customer has selected the enforce even distribution option.

As illustrated in FIG. 2, the webpage 200 provides users of the compute service an interface for generating a placement group. For example, the user requests a plurality compute instances to be launched and added to a new plurality of logical partitions, the plurality of compute instances and plurality of logical partitions forming a placement group. In addition, although not shown in FIG. 2, in a previous webpage of the management console of which webpage 200 is a part of, the customer may have been guided through the process of selecting a number, type, or various other options for the plurality of compute instances. Furthermore, the customer may be provided with the option of providing a name for the placement group. For example as illustrated in FIG. 2, the customer provides the name "Test_Partition" in the text field labeled "Name." In addition to providing the name for the placement group, the customer may select a placement strategy from a drop down list labeled "Strategy," as illustrated in FIG. 2.

The placement strategies may include a variety of different placement algorithms and/or strategies as described in the present disclosure such as a spread strategy, clustering, strategy, or any other algorithm or strategy for distributing compute instances among the plurality of logical partitions. Next, the customer may select a number of logical partitions from a drop down list labeled "Number of Logical Partitions." The drop down list, in various embodiments, includes a range of numbers from a minimum number of allowed partitions to a maximum number of allowed partitions. In yet other embodiments, the customer is allowed to enter the number of logical partitions into a text field or other otherwise not constrained to a minimum or maximum number of logical partitions. Finally, the customer may select, using a check box, whether to enforce even distribution. Selection of even distribution may cause the compute service to maintain the number of compute instance within each logical partition such that the number of compute instances across all logical partition is even or near even. For example, if there are 4 compute instances and 3 logical partitions, the compute service causes 2 of the logical partitions to include 1 compute instances and 1 of the logical partitions to include 2 compute instances.

Figure 3:
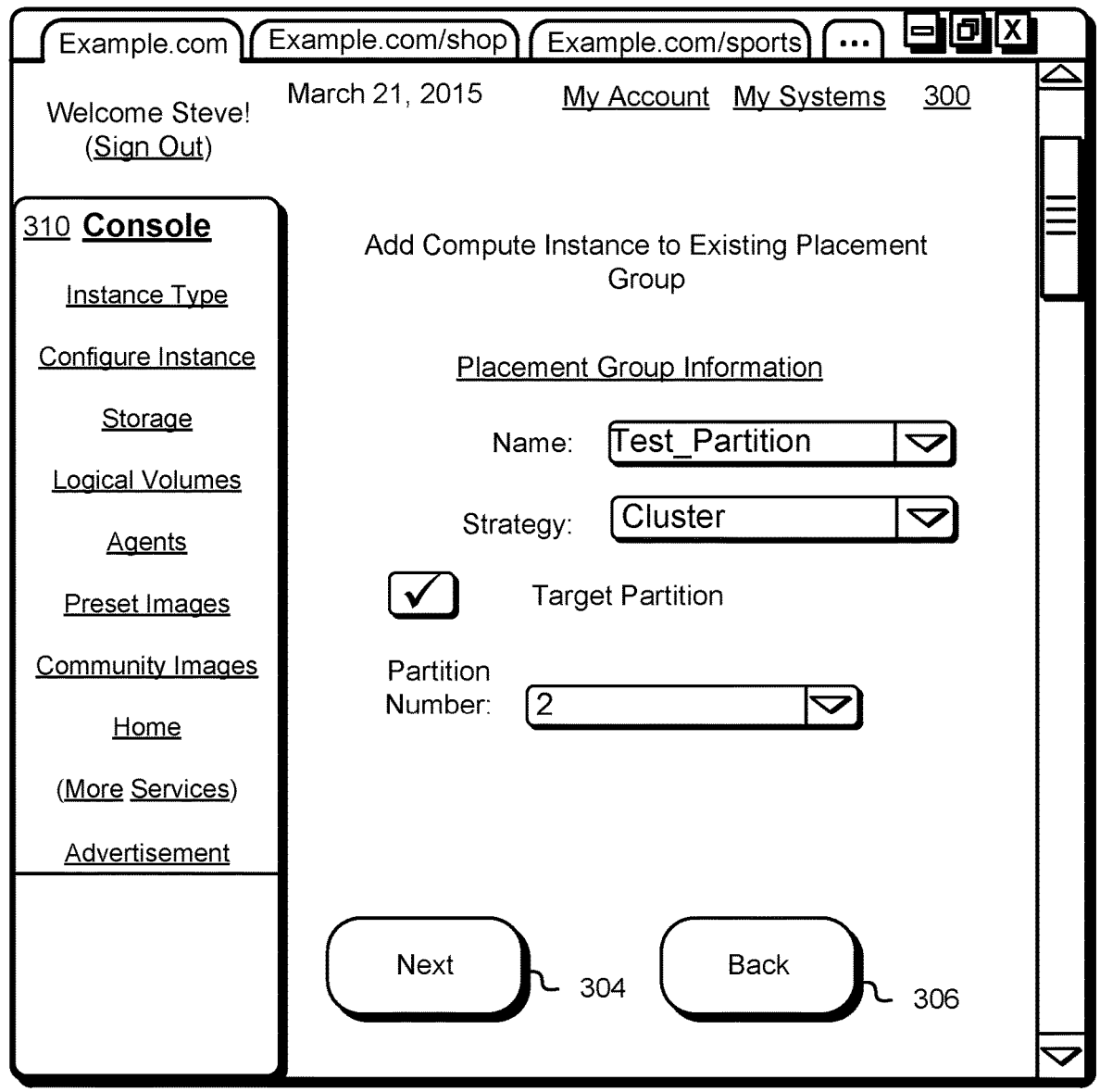
FIG. 3 is a diagram illustrating a management console exposed as a webpage enabling customers to place a customer operated compute instance in an existing placement group in accordance with at least one embodiment.

FIG. 3 shows a webpage 300 which may be displayed by an application executed by a computing system enabling a user to interact with a compute service operated by the computing resource service provider in accordance with an embodiment. As illustrated in FIG. 3, the webpage 300 includes various graphical user interface elements that enable customers to indicate information associated with the provisioning and distribution of compute instances provided by the compute service using computing resources of the computing resource service provider through a management console of which the webpage 300 is a part. In various embodiments, the user interacts with the compute service by issuing commands through the management console. The webpage 300 may be displayed by various applications, such as a mobile application or web browser. In this example, the webpage 300 includes various navigational features.

The webpage 300, as illustrated in FIG. 3, contains several elements described in greater detail above in connection with FIG. 2, such as a link 310, a next button 304, and a back button 306. In addition, the webpage 300 includes check boxes and text fields to enable the customer to provide additional user input. For example, as illustrated in FIG. 3, the customer, using an input device, selects to add compute instances to an existing placement group and selects a particular logical partition of the placement group to instantiate the compute instances within. As described in the present disclosure, each logical placement group may include a logical division and/or distribution of computing resources based at least in part on a diversity constraint. Furthermore, through the webpage 300 the customer may move compute instances out of a particular logical partition and/or into another logical partition of the same or different placement group. The webpage 300, in other embodiments, is used by the customer to add additional logical partitions to a particular placement group.

As illustrated in FIG. 3, the webpage 300 provides users of the compute service an interface for adding a compute instance to an existing placement group. The customer in a previous webpage of the management console of which webpage 300 is a part, may have selected a type of compute instance to have launched by the compute service. The customer may then select from drop down list, labeled as "Name," a name of the particular placement group the customer wished to launch the compute instance into. For example as illustrated in FIG. 3, the customer selects "Test Partition" from the drop-down list. The customer may then select a placement strategy using a drop down list as described above in connection with FIG. 2. Selection of the placement strategy, in various embodiments, causes the compute service to launch the compute instance into a logical partition in accordance with the placement strategy. In the example illustrated in FIG. 3, the customer selects a cluster placement strategy which causes the compute system to attempt to place the compute instance such that the compute instance is clustered close to the same diversity component (e.g., top of rack switch, power grid, etc.) as the other compute instances within the logical partition. Finally, the customer has the option to select a particular partition to launch the compute instance into. If the customer selected to check box "Target Partition," the customer is provided with the option to select a particular partition from a drop down list labeled "partition number." The selected partition number may correspond to a particular partition of the plurality of logical partitions.

The environment such as that illustrated in FIG. 1 may be useful for a service provider such as a computing resource provider, wherein the computing resource system responds to requests from customers to manage computer system instances (e.g., computer system instance operation and behavior) that execute a customer workload, application, or other operations. As discussed above, the computing resource system provides a mechanism to allow customers to manage the distribution of compute instances executed by various computing resources within a plurality of logical partitions defined by a diversity constraint, placement strategy, and/or other options selected by the customer. The environment in such a case may include additional components and/or other arrangements, such as those illustrated in the networked environment 400 of FIG. 4.

Figure 4:
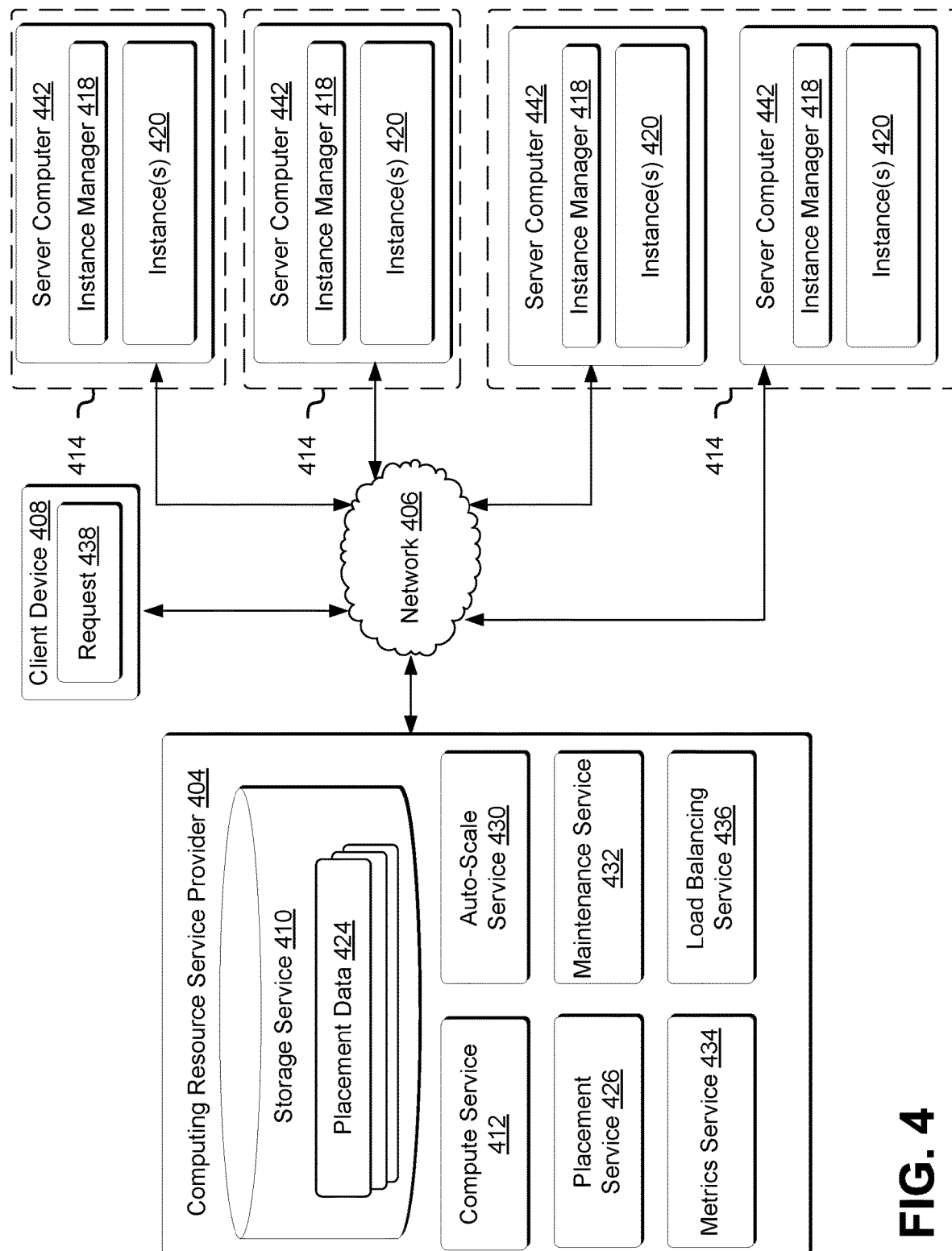
FIG. 4 illustrates an environment in which a compute service places compute instances operated by a customer in a plurality of logical partitions according to a placement strategy in accordance with an embodiment.

In the example illustrated in FIG. 4, the networked environment 400 includes a computing resource service provider 404 capable of communicating with a client device 408 and server computer systems 442 over a network 406. In one embodiment, the server computer systems 442 may be one or more computer hardware devices that are used to implement compute instances 420. For example, the server computer systems 442 may include hardware for implementing different types of computing resources, such as storage devices, virtualized storage devices, networking devices, and the other computing resources suitable for supporting compute instances 420 and services of the computing resource service provider 404 as described in greater detail below. Additionally, the implemented computing resources may be programmatically and remotely managed by the customer of the computing resource service provider 404 by transmitting one or more requests 438 from the client device 408 to the computing resource service provider 404.

The server computer systems 442 include a plurality of computer system devices that are each capable of executing one or more compute instances 420 of a particular type created by the computing resource service provider 404. In one embodiment, each of the server computer systems 442 includes a processor, a data store, an input/output bus, and/or any other component suitable for executing compute instances 420. Furthermore, the server computer systems 442 may be organized into server racks such that a plurality of server computers share computing resources such as switches, power devices, cooling, or other computing resources of the computing resource service provider. Additionally, the compute instances 420 may be virtual machine instances. A virtual machine instance is an instance of a software implementation executed on physical machine (e.g., a computer) that executes programs like a physical machine. For example, each of the server computer systems 442 may be configured to execute an instance manager 418 capable of implementing the compute instances 420.

The instance manager 418 may be a hypervisor, virtualization layer, operating system or another type of program that enables the execution of multiple compute instances 420 on a single server computer system 442, for example. As discussed above, each of the compute instances 420 may execute all or a portion of an application or a workload, such as a customer application or a service of the computing resource service provider 404. Additionally, the network 406 may be similar to the network as described above. The networked environment 400 may span one or more data centers, where each data center may be geographically distinct from each other. Additionally, the networked environment 400 shown in FIG. 4 may be one of several embodiments employed by the computing resource service provider.

In one embodiment, the computing resource service provider 404 includes a storage service 410 maintaining placement data 424, a compute service 412, a placement service 426, an auto-scaling service 430, a maintenance service 432, a metrics service 434, a load balancing service 436, and/or other components or service. The placement data 424 may include data related to customer operated compute instances 420, logical partitions 414, server computer systems 442, networks, or any other information suitable for determining the placement of a compute instance on a server computer 442 within a particular logical partition. For example, the placement data 424 includes an indicating of compute instances 420 executed by server computers 442 such that the placement service 426 may determine placement of other compute instances based at least in part on a set of available server computers, a set of server computes executing compute instances 420, and one or more diversity constraints of the logical partitions 414. As illustrated in FIG. 4, the placement data 424 is stored in storage devices maintained by the storage service 410. In various embodiments, the instance manager 418 or other component of the compute instance 420 or computing resource service provider 404 generates the placement data 424. The storage service 410 may include any number or type of storage devices that may be used to store data and/or expose storage locations. For example, the storage service 410 includes a set of physical storage devices exposed to the services of the computing resource service provider 404 and/or compute instances 420 as storage locations suitable for storing data.

As described above, the compute service 412 instantiates compute instances 420 based at least in part on a set of requirements and/or constraints provided by the customer. Furthermore, the compute service 412 may include a set of server computer systems or other physical hardware including executable code or other logic that, when executed by the server computer systems 442, causes the server computer systems 442 to perform the operations of the compute service 412 as described in the present disclosure. In one embodiment, the compute service 412 receives, from the customer through the client device 408, a request 438 to create one or more compute instances 420 and distribute the compute instance within a plurality of logical partitions 414. Additionally, the request 438 received from the customer through the client device 408 may also indicate additional information such as a placement strategy, distribution requirements, a number of logical partitions, auto-scaling information, load balancing information, or any other information suitable for distributing compute instances 420 into a plurality of logical partitions 414 according to a diversity constraint as described in the present disclosure.

In response to receiving the request, the compute service 412 instantiates compute instances 420 according to information associated with a placement group as indicated by the customer. Furthermore, as described above, the compute service 412 may create and/or update compute instances to be executed by server computer systems 442 associated with logical partitions 414. The customer may interact with the computing resource service provider 404 (via appropriately configured and authenticated API calls) to provision, operate, and manage compute instances 420 that are instantiated on server computer systems 442 operated by the computing resource service provider 404 and distributed among the logical partitions 414.

Additionally, the customer may create one or more auto-scaling groups, and the auto-scaling groups may be a logical collection of compute instances 420 configured to execute the customer workload or application managed by an auto-scale service 430. Furthermore, the compute instances 420 may be assigned to the auto-scaling group or may be members of the auto-scaling group. The auto-scaling service 430 may allow customers to interact with and manage various auto-scaling groups. For example, the customer may, through the auto-scaling service 430, set a maximum or minimum capacity for an auto-scaling group. The auto-scaling group may then manage the compute instances 420 assigned to the auto-scaling group in order to maintain the settings provided by the customer. Furthermore, the auto-scaling service 430 when performing scaling operations may interact with the placement service 426 and/or compute service 412 to add and/or remove compute instances 420 from logical partitions 414.

In various embodiments, the customer may create and manage compute instances 420 through a management console provided by the computing resource service provider 404 as described above in connection with FIGS. 2 and 3. The management console may be exposed to the customer as a webpage, and by interacting with the webpage (e.g., through a browser application), such as the webpage 200 described above, the customer may cause API calls to be generated. The generated API calls may cause the computing resource service provider 404 or component thereof to perform various operations indicated by the customer. The compute instances 420 may be used for various purposes, such as to operate as servers supporting a website, to operate business applications or, generally, to serve as computing power for the customer. Other applications for the compute instances 420 may be to support database applications, electronic commerce applications, business applications, and/or other applications. Although the compute service 412 is shown in FIG. 4, any other computer system or computer system service may be utilized by the computing resource service provider 404, such as a computer system or computer system service that does not employ virtualization or instantiation and instead provisions computing resources on dedicated or shared computers/servers and/or other physical devices.

The placement service 426 provisions the compute instances 420 to one or more of the server computer systems 442. In one embodiment, the placement service 426 determines the server computer systems 442 to provision the new compute instances 420 based at least in part on the indicated logical partitions 414 and one or more diversity constraints. For example, the placement service 426 may identify one or more server computer systems 442 with the appropriate capacity to execute the compute instances 420 that do not share a diversity component with any other server computer system 442 executing a compute instance associated with a particular logical partition. The diversity component, as described in greater detail below, may include any computing resource associated with a diversity constraint used to partition the logical partitions. For example, if a particular diversity constraint indicated that the plurality of logical partitions are divided such that no two compute instances of distinct partition are executed by the same rack, the diversity component may include a top of rack switch or other computing device that may be used to satisfy the diversity constraint.

The auto-scaling service 430 automatically scales the capacity of a collection of previously requested compute instances 420 up or down based at least in part on circumstances defined by the customer that requested the compute instances 420. For example, the auto-scaling service 430 may decrease the number of compute instances 420 allocated to the customer during demand lulls and increase the number of compute instances 420 allocated to the customer during demand peaks. In one embodiment, the auto-scaling service 430 causes additional compute instances to be instantiated and distributed between the plurality of logical partitions 414. In another embodiment, the auto-scaling service 430 causes a new logical partition to be created and compute instances 420 to be moved to the new logical partition. In some of these embodiments, the auto-scaling service 430, with or without an indication from the customer, violates one or more diversity requirements of the placement group to provide the customer with additional computing capacity.

The maintenance service 432 schedules maintenance, rack replacement, rack retirement, rack consolidation, software updates, and/or firmware updates for the server computer systems 442. In one embodiment, the maintenance service 432 schedules the maintenance and/or software updates at an appropriate time based at least in part on the available capacity of the server computer systems 442. For example, the maintenance service 432 may schedule the maintenance and software updates at a time when the respective server computer system 442 has a projected availability. In one embodiment, the maintenance service 432 may patch and restart the server computer systems 442 when the maintenance service 432 determines that the server computer system 442 is not hosting any compute instances 420. Additionally, the maintenance service 432 may patch virtual machines associated with the instance 420 if necessary prior to instantiating new images that are associated with the respective virtual machines. For example, the maintenance service 432 may schedule a patch of the machine image based at least in part on the health status of the compute instances 420. In one embodiment, no additional instances may be provisioned on the server computer system 442 until the scheduled maintenance is completed.

However, in some embodiments, the server computer systems 442 are required to be patched, replaced, repaired, and/or retired while still executing compute instances 420. In such embodiments, the compute service 412 or other service of the computing resource service provider 404 may cause the compute instances 420 to be moved to a different server computer associated with the same logical partition or a new logical partition. In such embodiments, the placement data 424 is used to determine the different server computer to execute the compute instance 420. The maintenance service 432 may also periodically or aperiodically check the health status of the compute instances 420, including instances assigned to the plurality of logical partitions 414. The health check may include determining the load, utilization, and operation of various components of the compute instances 420 such as the central processing unit, memory, networking interface, operating system, application, and other components of the compute instances 420. In various embodiments, when the maintenance service 432 determines that a compute instance 420 is unhealthy, based at least in part on the health check, the maintenance service 432 or other component of the service provider 404, such as the auto-scaling service 430, may initiate a workflow to terminate and/or repair the unhealthy compute instance while maintaining the diversity constraints of the placement group.

The metrics service 434 may be responsible for collecting instance data and/or customer workload data corresponding to the compute instances 420. The instance data obtained by the metrics service 434 may indicate the utilization of various components of the compute instances 420 such as the central processing unit, memory, networking interface, operating system, applications, and other components of the compute instances 420. Additionally, the information may be used by the maintenance service 432 to determine the health of a compute instance 420 and/or a server computer system 442. The metrics service 434 may obtain and aggregate utilization information for all of the compute instances 420 executing customer workloads or applications.

The load balancing service 436 may be offered to customers of a computing resource service provider 404 in order to facilitate request processing by compute instances 420. In various embodiments, the compute instances 420 may be assigned to an auto-scaling group and the load-balancing service 436 may distribute traffic to the compute instances 420 assigned to the auto-scaling group. For example, the customer may operate a website using compute instances 420 assigned to the auto-scaling group using the resources of a computing resource service provider 404. Additionally, the website may receive requests from multiple other customers over the network 406. The computing resource service provider 404 may cause a load balancer of the load balancing service 436 to direct the requests to the compute instances 420 of the auto-scaling group executing the website in such a way that the load generated by processing the requests is distributed among the compute instances 420 of the auto-scaling group executing the website.

The load balancing service 436 may be a computer system or virtual computer system including computing resources that distribute the request to the compute instances 420 assigned to a load balancer in order to optimize resource utilization and/or avoid overloading a particular server computer system 442. For example, the load balancer may include physical hardware connected to a server rack or otherwise included in a data center. In another example, the load balancer may include one or more virtual machines supported by a server computer system 442. In various embodiments, the load balancer may obtain instance data and/or customer workload data and distribute traffic to the compute instances 420 based at least in part on the obtained instance data and/or customer workload data. For example, the load balancing service 436 may distribute traffic based at least in part on a capacity of a particular computer system instance indicated in the instance data.

Figure 5:
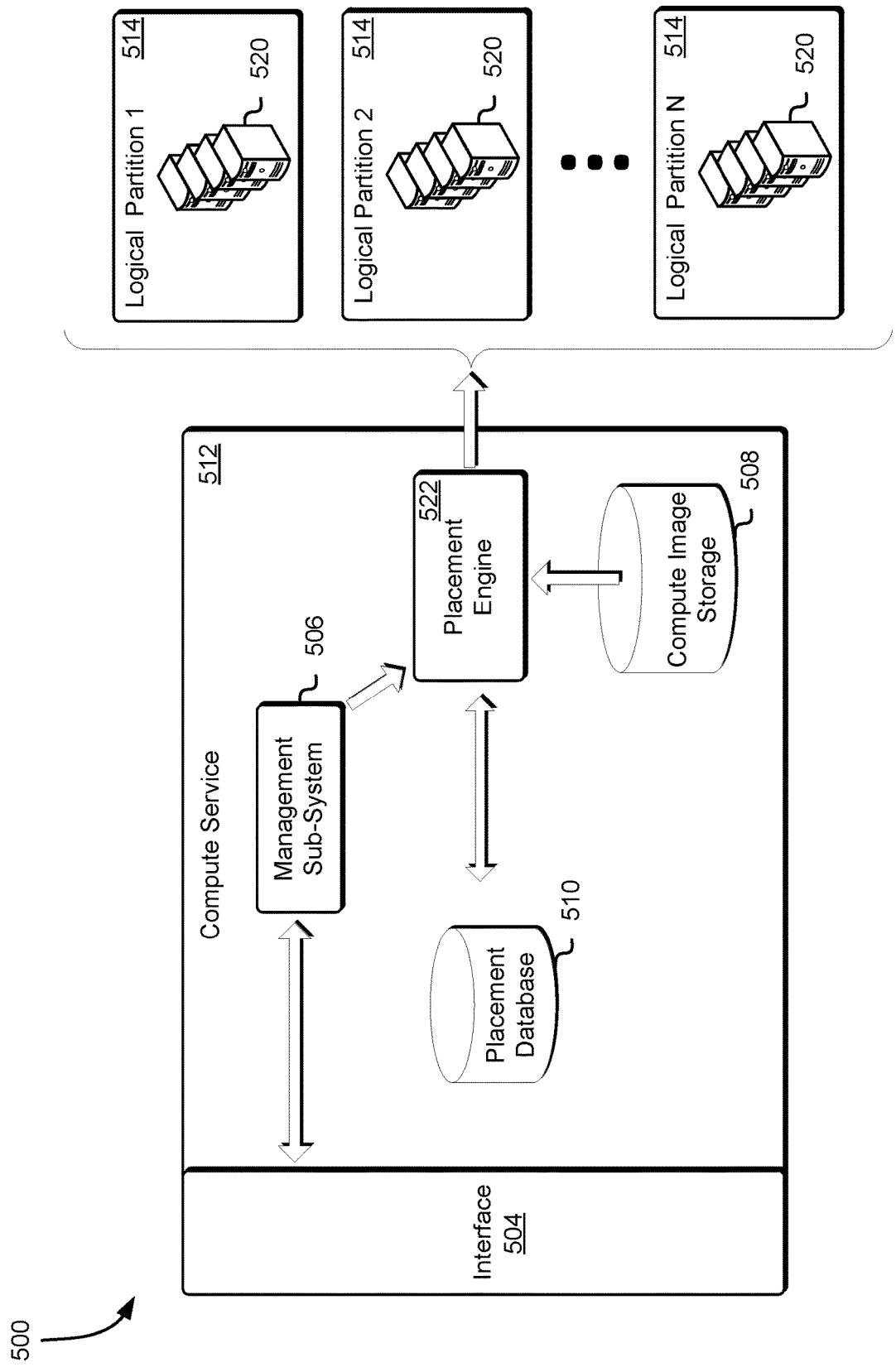
FIG. 5 illustrates an environment in which a compute service places compute instances operated by a customer in a plurality of logical partitions according to a placement strategy in accordance with an embodiment.

FIG. 5 illustrates an environment 500 in which a compute service 512 determines placement for one or more compute instances based at least in part on customer preferences and locations of existing compute instances in accordance with at least one embodiment. The compute service 512 may include a plurality of physical host computer systems as described above used to instantiate compute instances 520 on behalf of the customers of the computing resource service provider. Customers of the computing resource service provider may interact with the compute service 512 to provision and operate compute instances 520 that are instantiated on physical computing devices (e.g., server computer systems) hosted and operated by the computing resource service provider. The compute instances 520 may be used for various purposes, such as to operate as servers supporting a website. Other applications for the compute instances 520 may be to support database applications, electronic commerce applications, business applications, and/or other applications. In addition, as described in the present disclosure, customers may define various preferences and/or options for distributing the compute instances 520 among a plurality of logical partitions 514.

In an embodiment, the compute service 512 provides an interface 504 to customers of the computing resource service provider, which may be utilized by customers to request instantiation of one or more compute instances within any of the logical partitions 514 created by the compute service 512 or component thereof such as a placement engine 522. A customer may utilize the interface 504 through one or more communications networks, such as the Internet. The interface 504 may contain certain security safeguards to ensure that the customer has authorization to access the compute service 512. For instance, in order to access the compute service 512, a customer may need to provide a username and a corresponding password or encryption key when using the customer interface 504. Additionally, requests (e.g., application programming interface (API) calls) submitted to the interface 504 may require an electronic signature generated using a cryptographic key such that the electronic signature is verifiable by the compute service 512, such as by an authorization system (not illustrated in FIG. 5 for simplicity).

Once the customer has gained access to the compute service 512 through the interface 504, the compute service 512 may allow the customer to interact through the interface 504 with a management sub-system 506. The management sub-system 506 may include a variety of computer systems configured to enable a customer to remotely provision a virtual machine instance, such as a webserver exposing a webpage as described in greater detail above in connection with FIGS. 2 and 3. A customer may use the interface 504 and the management sub-system 506 to provision and instantiate a virtual machine instance that includes an operating system and a variety of applications included in compute image storage 508. The operating system and the various applications may be maintained in compute image storage 508 in the form of machine images. When a customer submits a request for instantiation of a compute instance 520 through the management sub-system 506, the compute service 512 may identify the machine image the customer has requested in the compute image storage 508 and allocate the resources necessary (e.g., the processors and random-access memory (RAM) required to operate the components of the machine image) to process the machine image. The machine image may be instantiated on one or more physical storage devices (e.g., one or more servers or hard drives) within a logical partition 514, where a server computer system may execute the compute instance.

As described above, through the interface 504 the customer may further specify one or more diversity constraints and/or logical partitions 514 that may be used to determine the logical partition 514 where the requested compute instance is to be instantiated. For example, the customer may request that a compute instance be instantiated with logical partition 1. This may cause the placement engine 522 to determine a set of server computer systems associated with logical partition 1 based at least in part on information maintained in a placement database 510. Furthermore, if no such server computer systems are found matching the criteria (e.g., a server computer system associated with logical partition 1) or no such server computers matching the criteria have sufficient capacity to instantiate the compute instance, the placement engine 522 may determine a new server computer system to instantiate the computer instance and update the placement database 510 to indicate that the new server computer systems is now associated with logical partition 1. The placement engine 522, when determining new server computer systems to instantiate computer instances, may determine if the server computer systems may be added to one or more logical partitions 514 without violating the diversity constraints of the logical partitions.

Additionally, the diversity constraints may include but are not limited to commonality of hardware used for the customer's compute instances, hardware that provides the greatest performance capabilities for the compute instances, newest hardware, and the like. In some embodiments, the customer is not required to provide diversity constraints for placement of the requested virtual machine instance. In such cases, the management sub-system 506 may utilize one or more default diversity constraints as defined by the computing resource service provider for selection of the logical partitions 514 based at least in part on a particular workload or application to be executed by the customer.

The management sub-system 506 may receive a request for compute instances 520 and determine to provide the request to the placement engine 522 based at least in part on information included in the request. For example, the request may indicate that the requested compute instances are to be placed in a new or existing logical partition(s) 514. The placement engine 522, during processing of the request, may obtain information from the placement database 510 to determine whether the customer has any existing compute instances within any of the logical partitions 514 provided by the computing resource service provider. Similar to the storage devices described in the present disclosure, the placement database 510 may include one or more computer systems configured to collectively store information regarding each customer's compute instances 520, logical partitions 514, or any other information which may be used by the placement engine 522 to determine a suitable placement location for the requested compute instance 520.

For instance, for each customer entry within the placement database 510, the entry may specify an identifier for each of the customer's existing compute instances 520, as well as the logical partitions 514, diversity constraints, server computer computers executing the customer's compute instance, and/or other information associated with a placement group. In various embodiments, when the placement engine 522 instantiates new compute instances on behalf of the customer, the placement engine 522 updates the placement database 510. The placement engine 522 may include an application or other executable code that, when executed by one or more processors, causes the placement engine 522 to determine a logical partition 514 and server computer system to executed a computer instance. The placement engine 522 may utilize the provided information to sort the various logical partitions 514 into an ordering usable to determine which logical partition 514 may be used for instantiation of the new compute instance. For instance, in an embodiment, the placement engine 522 utilizes a set of decision rules to select a logical partition 514 and server computer system for instantiation of the new compute instance. The various rules may be based at least in part on the diversity constraints provided by the customer, information obtained from the placement database 510 (e.g., server computer information), a hierarchical structure of the logical partitions, a placement strategy, or any other option for distributing compute instances.

In an alternative embodiment, the placement engine 522 calculates a composite score for each logical partition 514 based at least in part on the diversity constraints and other information associated with the placement group (e.g., spread algorithm). The placement engine 522 may rank or otherwise score the various logical partitions 514 for various diversity constraints specified by the customer. The placement engine 522 may use a variety of mechanisms for creating and/or selecting logical partitions 514 to provision compute instances. For example, if the customer is requesting a new placement group (e.g., new compute instances to be launched within new logical partitions), the placement engine may select a first server computer system to execute a first compute instance and to be associated with a first logical partition. This selection may be based on capacity, availability, metrics, usage pattern, or any other suitable basis because no other compute instances have been provisioned and therefore no diversity constraints may be violated.

The placement engine 522, as described above, may then create an entry in the placement database 510 indicating the placement of the first compute instance. Subsequently, when the placement engine 522 determines a location for the second compute instance, the placement engine 522 may determine a set of suitable server computer systems based at least in part on the information in the placement database 510. For example, if the diversity constraint is a server rack, then the rack in which the first server computer is located is associated with the first partition and may be excluded in the placement engine determined to place the second compute instances in a different logical partition from logical partition 1. In various embodiments, the placement engine 522 may determine the placement of a plurality of compute instances and then cause the plurality of compute instances to be instated. Put in other words, if the customer requests twenty compute instances, the placement engine 522 may instantiate the compute instances in parallel (e.g., determine the location for each compute instance, then cause all compute instances to be instantiated at once) or in serial (e.g., determine the location for one compute instance and cause the compute instance to be instantiated before determining the location for the next compute instance).

Figure 6:
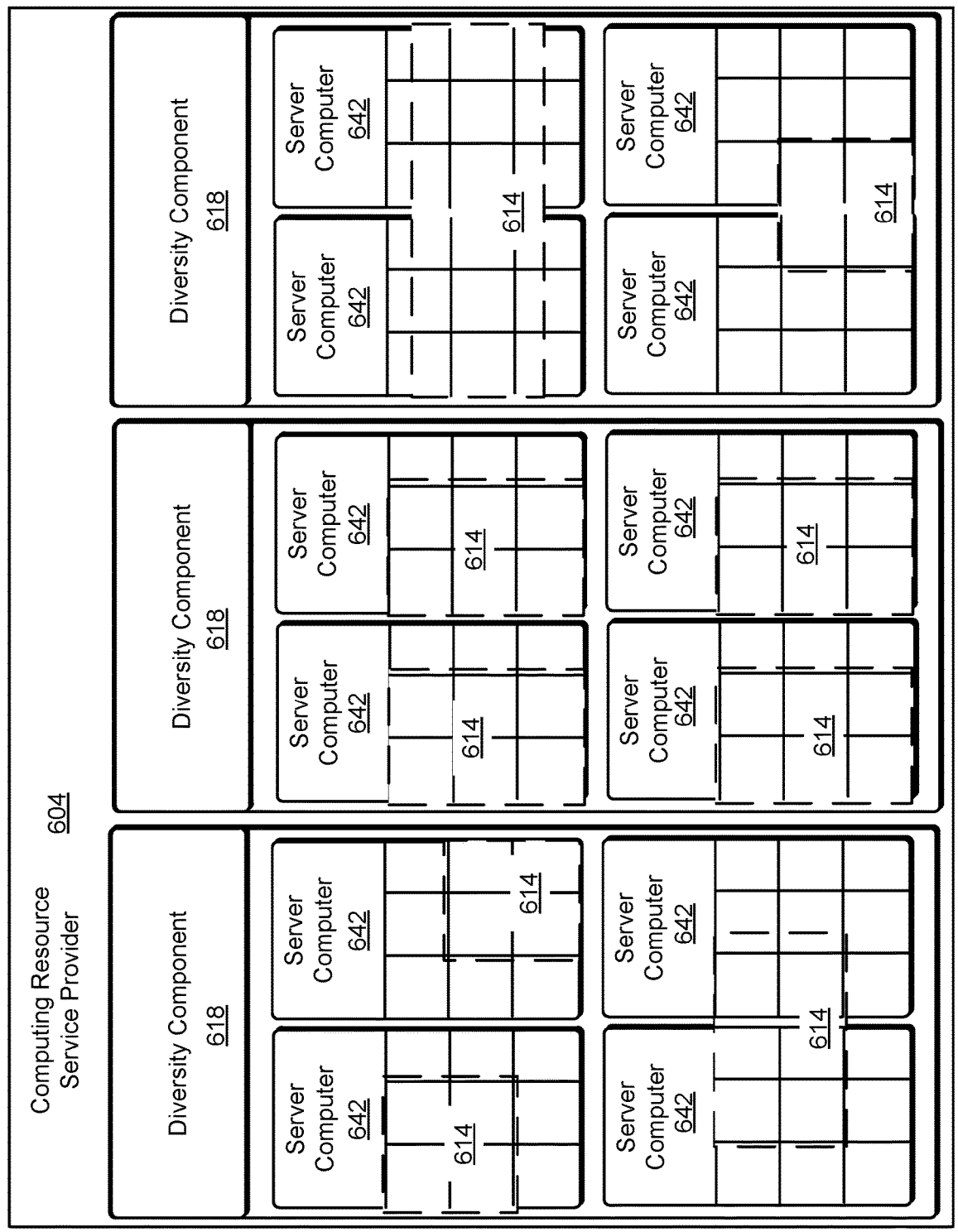
FIG. 6 illustrates an environment in which a compute service places compute instances operated by a customer in a plurality of logical partitions according to a placement strategy in accordance with an embodiment.

FIG. 6 illustrates an environment 600 in which a group of compute instances operated by a customer are distributed among a plurality of logical partitions 614 in accordance with an embodiment. The group of compute instances may be provided by a computing resource service provider 604 and server computer systems 642. In one embodiment, the server computer systems 642 may be one or more computer hardware devices that are used to implement compute instances. For example, the server computer systems 642 may include hardware for implementing different types of computing resources, such as storage devices, virtualized storage devices, networking devices, and the other computing resources suitable for supporting compute instances and services of the computing resource service provider 604 as described in greater detail above.

As illustrated in FIG. 6, the server computer systems 642 executing the compute instances may be organized and/or distributed based at least in part on a diversity component 618. The diversity component 618 may include any physical computing resource, virtual computing resource, or combination thereof which may be used to differentiate server computer systems 642. For example, the diversity component 618 includes a power component attached to a set of server computer systems. In another example, the diversity component 618 includes a virtual private network accessible by a set of server computer systems. Furthermore, the computing resources of the server computer systems 642 may be used to execute compute instances as described above. The compute instances, in various embodiments, are associated with a particular logical partition 614 illustrated in FIG. 6 with dotted lines. The server computer systems 642 may have a certain amount of capacity to execute compute instances and may execute compute instances associated with a plurality of logical partitions.

In various embodiments, the compute instances within a particular logical partition are distributed according to a particular placement strategy. For example, compute instances of a single partition are clustered within a single server computer according to a cluster algorithm as described above. This may enable lower latency for certain applications. In another example, the execution of the compute instances is evenly distributed among the server computer systems. In some embodiments, different placement strategies are used between different logical partitions of the same placement group.

Figure 7:
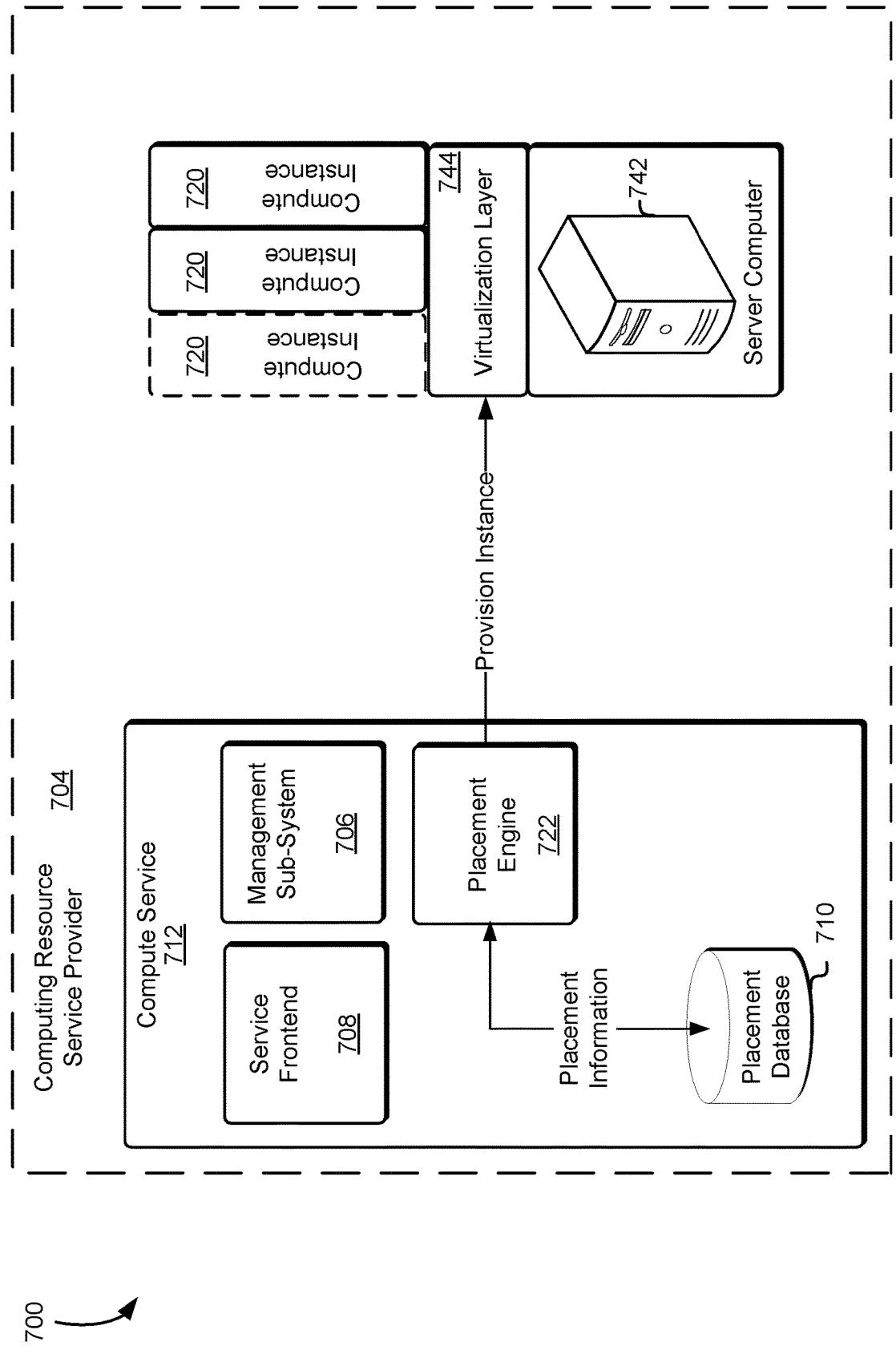
FIG. 7 illustrates an environment in which a compute service places compute instances operated by a customer in a plurality of logical partitions according to a placement strategy in accordance with an embodiment.

FIG. 7 illustrates an environment 700 in which a compute service 712 of a computing resource service provider 704 may provision a compute instance 720 in accordance with at least one embodiment. The compute service 712, which may be implemented by physical hardware, is used by the computing resource service provider 704 to provide computing resources such as compute instance 720 to customers and/or other services of the computing resource service provider 704 as described in greater detail above. The compute service 712 may include a group of computing systems such as the server computer systems 742 that provision computing resources as described above. The compute service 712, as illustrated in FIG. 7, also includes a service frontend 708, a management sub-system 706, a placement engine 722, and a placement database 710 as described in greater detail above in connection with FIG. 5. The service frontend 708, as described in greater detail above, may receive requests from customers and transmit information, such as responses to customers. The management sub-system 706 may instantiate, manage, and/or communicate with the compute instances 720.

The physical hardware may include a server computer 742 as described above in FIG. 4. In addition, a virtualization layer 744 may include a process or application executed by the server computer 742 that provides the computer system instances 720 (e.g., virtual machines) with access to the physical resources of the service computer 742 as described above in connection with FIG. 4. Commands and other information may be included in a service call, such as an API call, from the compute service 712 or the management sub-system 706 to the virtualization layer 744. The compute service 712 enables the customers and other services of the computing resource service provider 704 to manage the server computer system's 742 execution of the compute instances 720 such that points of failure can be avoided by distributing the execution of the compute instances 720 into a plurality of logical partitions. For example, the customer transmits a request to a service frontend 708 to instantiate a group of compute instances 720. In one embodiment, in response to the request, the compute service 712 causes the placement engine 722 to determine a server computer 742 to execute at least one compute instance of the group of compute instances, illustrated in FIG. 7 with a dotted line.

As described above, the placement engine 722 may obtain placement information from the placement database 710. The placement engine 722 may then determine the server computer system 742 to instantiate the at least one compute instance of the group of compute instances based at least in part on the placement information. For example, the placement information may indicate that the server computer systems 742 does not share a top of rack switch with any other server computer system executing a computer instance of the group of computer instances. As a result, the placement engine 722 or other component of the compute service 712, such as the management sub-system 706, may transmit a service call and/or command to the virtualization layer to execute the at least one computer instance. In addition, the placement engine 722 may then update the placement database 710 to indicate that the at least one computer instance is being executed by the service computer system.

Figure 8:
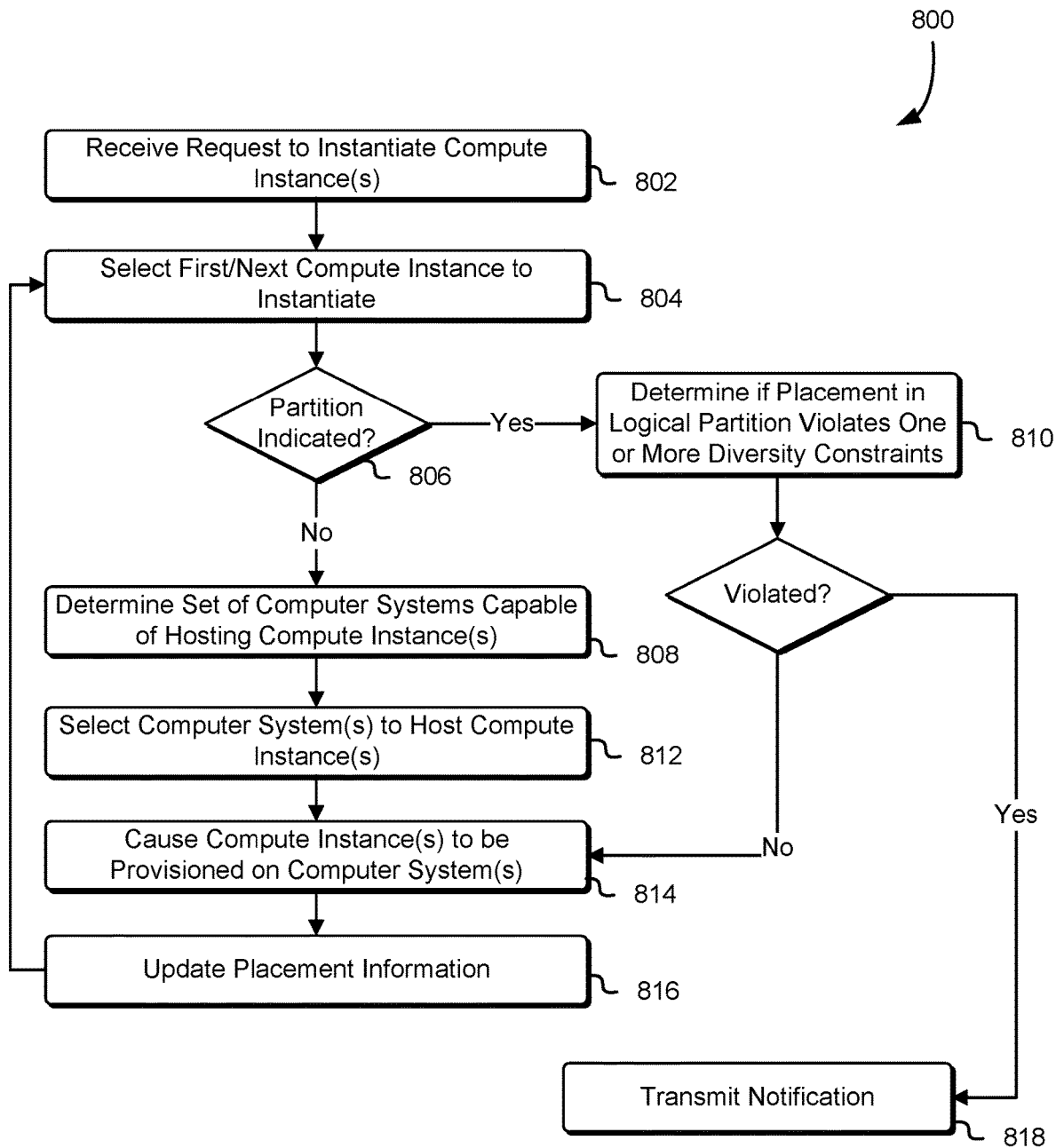
FIG. 8 is a block diagram illustrating a process for distributing customer operated compute instances among a plurality of logical partitions in accordance with an embodiment.

FIG. 8 is a block diagram illustrating an example of a process 800 for provisioning a group of compute instances using server computer systems distributed among a plurality of logical partitions in accordance with at least one embodiment. Some or all of the process 800 (or any other processes described, or variations, and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 800 may be performed by any suitable system such as a server in a data center by various components of the environment 500, described in conjunction with FIG. 5 such as the compute service 512, by multiple computing devices in a distributed system of a computing resource service provider, or by a service provided by a computing resource service provider. For example, the process 800 includes receiving a request to instantiate a group of compute instances 802. As described above, the customer may provide various preferences and/or options for instantiating the group of compute instances such as a number of partitions, a diversity constraint, and/or a spread of compute instances within the logical partitions. In addition, the request may indicate particular compute instances to instantiate within particular logical partitions. The request, as described above, may be received at an interface and directed to a placement engine or other component of the compute service.

The system executing the process 800 may then select the first/next compute instance to instantiate 804. The compute instance may be selected from the group of compute instances to be instantiated. In various embodiments, the request may simply indicate a number of compute instances to be instantiated, and the placement engine may simply perform placement operations until the indicated number is reached. Furthermore, the system executing the process 800 may determine if a particular logical partition is indicated 806. If a particular logical partition is indicated, the system executing the process 800 may determine if placement within the indicated logical partition violated one or more diversity constraints 810. For example, placement in the indicated logical partition may cause the compute instances within the partition to become unbalanced. In another example, the server computers associated with the indicated partition may have insufficient capacity to instantiate the compute instance.

If the one or more diversity constraints would be violated by placement within the indicated partition, the system executing the process 800 may transmit a notification 818. The notification may be transmitted to a customer in response to the request. In addition, the notification may indicate that the compute instance was not provisioned within the indicated logical partition, or that the compute instance was provisioned within the indicated logical partition but that the one or more diversity constraints have been violated as a result. However, if the one or more diversity constraints are not violated, the system executing the process 800 may provision the compute instance on a server computer system associated with the indicated logical partition 814.

Returning to FIG. 8, if no logical partition is indicated, then the system executing the process 800 may determine a set of computer systems capable of hosting the compute instance 808. As described above, the placement engine may obtain placement information from a placement database or other data store. In addition, information may be obtained from one or more other services of a computing resource service provider. The system executing the process 800 may then select a computer system of the set of computer systems to host the compute instance 812. The selection, in various embodiments, is determined based at least in part on the placement information and one or more diversity constraints, as described above. For example, the placement engine may eliminate from the set of computer systems any computer system that shares the same diversity component as another computer system associated with a logical partition of a plurality of logical partitions the group of compute instances are to be distributed among.

The system executing the process 800 may then cause the compute instance to be provisioned on the selected computer system 814. As described above, the compute service, in some embodiments, transmits a command to a virtualization layer of the computer system to execute the compute instance. The command may indicate a type of compute instance to be executed (e.g., virtual machine or container instance) and may indicate a machine image to use to instantiate the compute instance. The system executing the process 800 may then update the placement information 816. The update may be an update to the placement database as described above. In addition, the update may indicate an identifier of the computer instance, the computer system, and the logical partition. The system executing the process 800 may then (if compute instances remain to be instantiated) return to step 804 and continue the process 800 until there are no compute instances remaining to be added to the plurality of logical partitions or the process is otherwise terminated.

Note that one or more of the operations performed in 802-818 may be performed in various orders and combinations, including in parallel. For example, the placement engine may determine the set of hosts to execute particular compute instances prior to causing the compute instances to be provisioned. In addition, in numerous variations to the process 800, one or more of the operations 802-818 may be omitted or performed by other systems of services. For example, the placement engine may not check if a logical partition is indicated. In numerous variations to the process 800, the compute service selected logical partitions to place compute instances within according to a round robin or other selection strategy.

Figure 9:
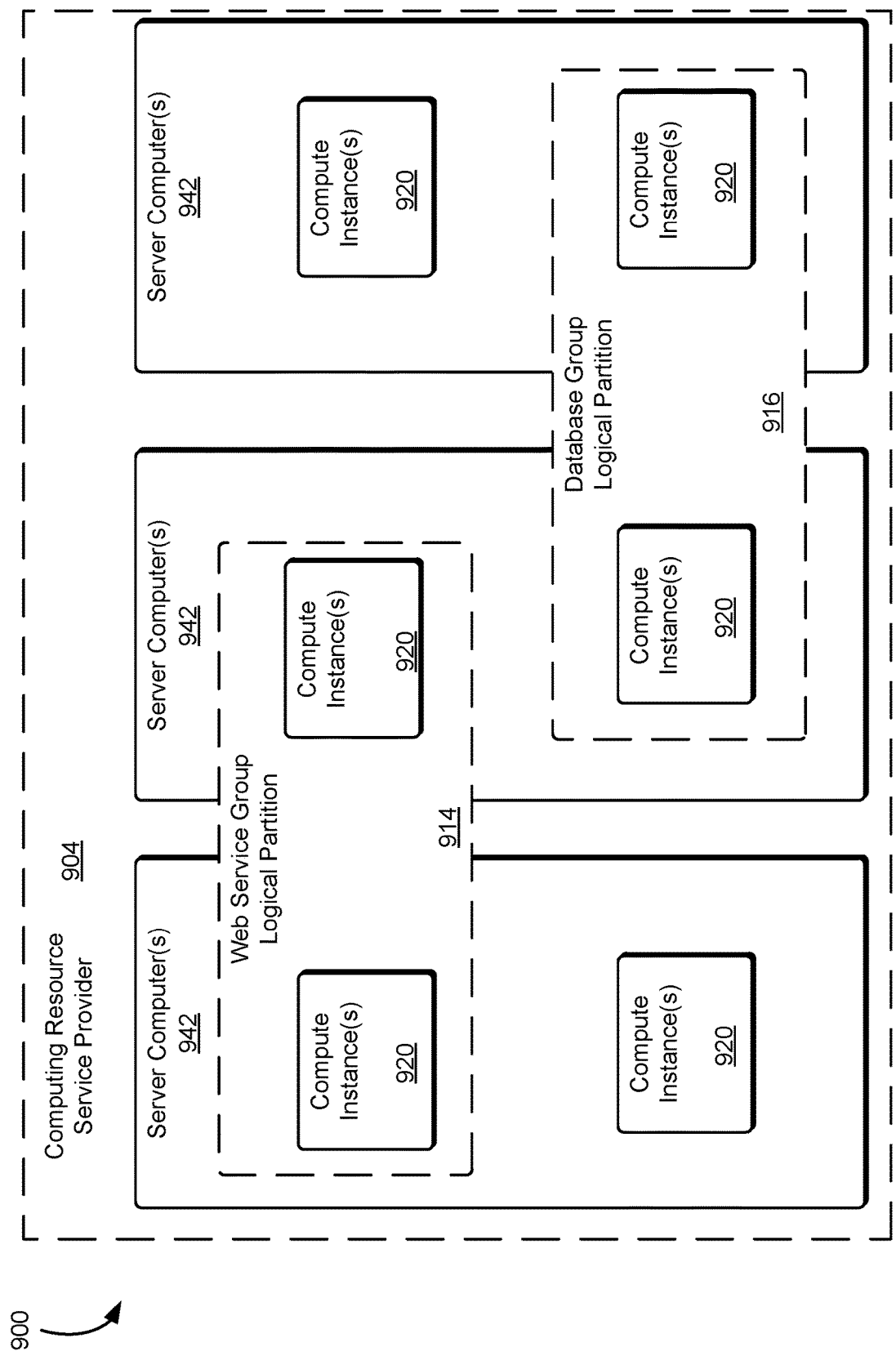
FIG. 9 illustrates an environment in which a compute service places compute instances operated by a customer in a plurality of placement groups according to a placement strategy in accordance with an embodiment.

FIG. 9 illustrates an environment 900 in which a group of compute instances operated by a customer are distributed among a plurality of placement groups in accordance with an embodiment. The compute instances may be provided by a computing resource service provider 904 and implemented using server computer systems 942 as described above. In one embodiment, the server computer systems 942 may be one or more computer hardware devices that are used to implement compute instances 920. For example, the server computer systems 942 may include hardware for implementing different types of computing resources, such as storage devices, virtualized storage devices, networking devices, and the other computing resources suitable for supporting compute instances 920 and services of the computing resource service provider 904 as described in greater detail above.

In various embodiments, the server computer systems 942 executing the compute instances 920 may be organized and/or distributed based at least in part on a diversity constraint as described above. For example, the diversity constraint may include any physical computing resource, virtual computing resource, or combination thereof which may be used to differentiate server computer systems 942. In an embodiment, the diversity constraint includes a power component attached to a set of server computer systems. In another embodiment, the diversity constraint includes a virtual private network accessible by a set of server computer systems. In yet another embodiment, the diversity constraint includes a storage device provided by a data storage service. In addition, the computing resources of the server computer systems 942 may be used to execute compute instances 920 as described above. The compute instances 920, in various embodiments, are associated with a particular logical partition illustrated in FIG. 9 with dotted lines. The server computer systems 942 may have a certain amount of capacity to execute compute instances 920 and may execute compute instances 920 associated with a plurality of logical partitions.

In various embodiments, a customer may define a plurality of placement groups. A placement group may include a plurality of compute instances 920 distributed among a plurality of logical partitions according to a diversity constraint that executes a particular application or performs a particular function on behalf of the customer. As illustrated in FIG. 9, a customer (or multiple customers) may operate a web service placement group including a web service group of logical partitions 914 of a plurality of web service group logical partitions and a database placement group including a database group logical partition 916 of a plurality of logical partitions 916. The web service group logical partition 914 and the database group logical partition 916 may operate in accordance with the logical partition as described any of the embodiments of the present disclosure.

In one example, the web service placement group includes five web service group logical partitions including ten compute instances 920 evenly distributed according to a placement strategy and the five web service group logical partitions distributed among the server computers 942 according to a diversity constraint that causes no two server computers 942 to share a particular type of network appliance (e.g., network router or top of rack switch). In this example, the customer may be provided with a highly available web services fleet to reduce down time or intervals of unavailability of the customer web service.

In another example, the database placement group includes three database group logical partitions including ten compute instances 920 clustered relative to a diversity constraint according to a placement strategy. The three database group logical partitions distributed among the server computers 942 according to the diversity constraint such that no two server computers 942 share the same storage device and/or logical partition. In this example, the customer may be provided with data redundancy since no two logical partitions share the same storage device in addition to reduced network latency and faster request processing because the compute instances 920 are clustered on the same server computers 942.

Figure 10:
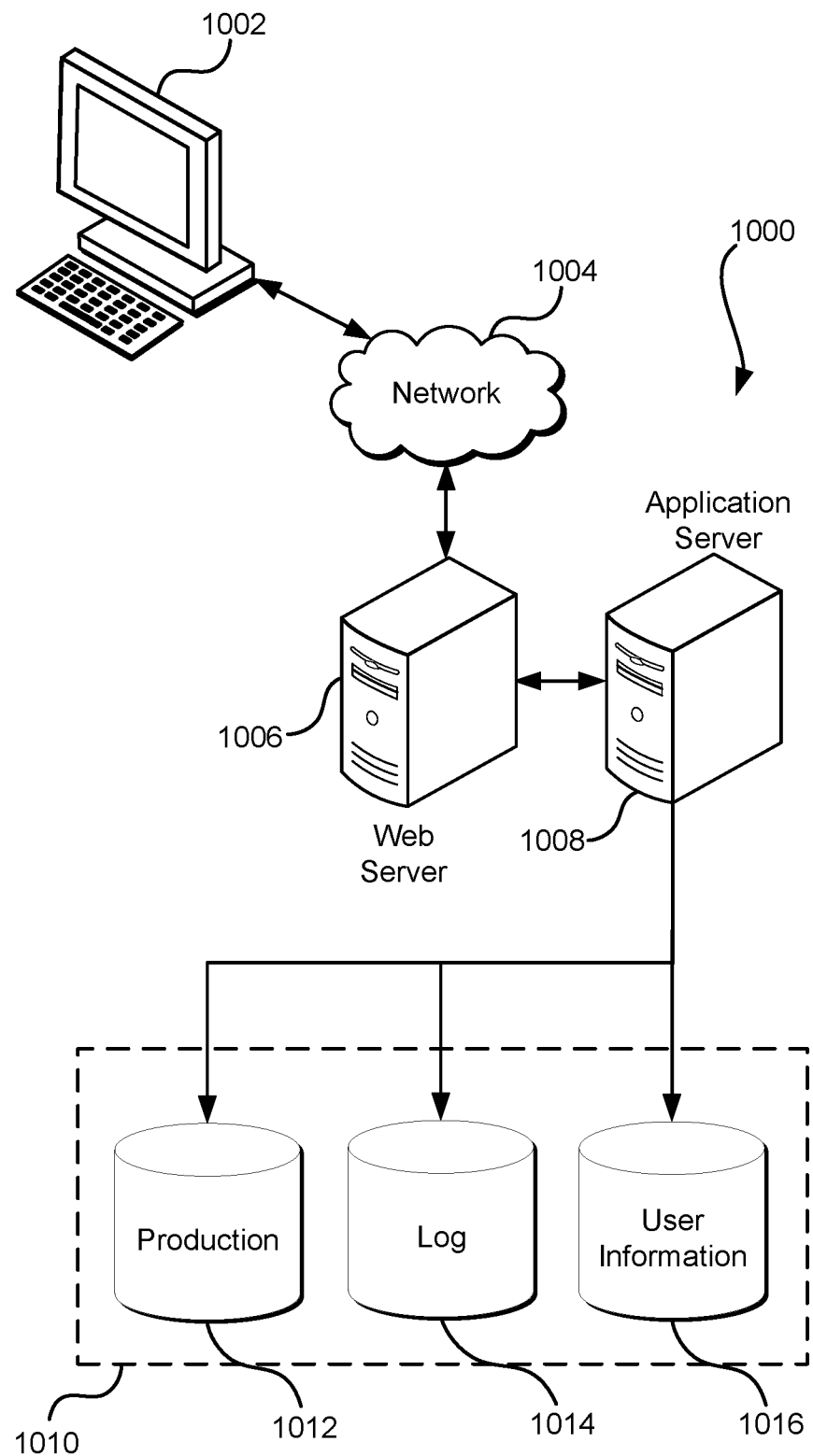
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PUP: Hypertext Preprocessor ("PUP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PUP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
providing an interface to enable a requestor operating a device to select a number of logical partitions, a diversity constraint, and a placement strategy to place a group of compute instances among the number of logical partitions selected from a plurality of logical partitions in a computing environment operated by the requestor associated with the request, where the placement strategy comprises even distribution or clustered distribution of the group of compute instances among the number of logical partitions;
receiving, by a service of a computing resource service provider, in response to an interaction with the interface, a request associated with the requestor to instantiate the group of compute instances, the request indicating the number of logical partitions, the diversity constraint, and the placement strategy defining placement of the group of compute instances among the number of logical partitions within the computing environment based at least in part on interactions with the interface;
obtaining, from a database, placement information indicating a set of host computer systems of the computing resource service provider responsible for providing the computer environment;
determining, by the service, a first subset of host computer systems of the set of host computer systems and a second subset of host computer systems of the set of host computer systems on which to launch the group of compute instances based at least in part on the placement information indicating that the first subset of host computer systems and the second subset of host computer systems corresponding to different logical partitions of the plurality of logical partitions and the diversity constraint that indicates a set of hardware-based conditions for hosting the plurality of logical partitions to prevent a hardware failure from disabling multiple logical partitions of the plurality of logical partitions, a first hardware-based condition of the set of hardware-based conditions indicating that the first subset of host computer systems is not to share a particular type of network device with the second subset of host computer systems;
causing, by the service, a first compute instance of the group of compute instances to be launched on the first subset of host computer systems and a second compute instance of the group of compute instances to be launched on the second subset of host computer systems according to the placement strategy and the diversity constraint among the plurality of logical partitions such that the first subset of host computer systems is associated with a first network device and the second subset of host computer systems is associated with a second network device to satisfy the first hardware-based condition; and
updating the database based at least in part on the placement information to indicate the first subset of host computer systems are within a first logical partition of the plurality of logical partitions and the second subset of host computer systems are within a second logical partition of the plurality of logical partitions.

2. The computer-implemented method of claim 1, wherein the diversity constraint associated with the plurality of logical partitions indicates that a power source is not to be shared between host computer systems of distinct logical partitions.

3. The computer-implemented method of claim 1, wherein the placement strategy is used to balance a number of compute instances within a pair of logical partitions such that the number of compute instances included in the pair of logical partitions is within a threshold value.

4. The computer-implemented method of claim 1, wherein the placement strategy is used to cause a number of compute instances to be clustered within the first logical partition on a first host computer system of the first subset of host computer systems, such that an amount of network latency between the number of compute instances is reduced.

5. A system, comprising:
one or more processors; and
memory that stores computer-executable instructions that, as a result of being executed, cause the system to:
receive, by a service of a computing resource service provider, a request to launch a compute instance within a first set of logical partitions in a computing environment operated by an entity of a plurality of entities, the request generated based at least in part on a set of interactions from an interface of a device associated with the entity indicating a diversity constraint identifying at least one type of hardware-based placement condition for placing a first set of server computer systems participating in the first set of logical partitions and a second set of server computer systems participating in a second set of logical partitions, a number of the first set of logical partitions that are associated with the entity, and a placement strategy associated with the entity, the placement strategy corresponding to a placement algorithm of a plurality of placement algorithms available for selection including at least even distribution and clustered distribution;
select, by the service, a server computer system based at least in part on the placement strategy associated with the entity, the diversity constraint, and placement information obtained from a database that indicates a set of other compute instances associated with the entity in the first set of logical partitions, where at least one other entity of the plurality of entities is associated with the second set of logical partitions;
cause, by the service, the server computer system to launch the compute instance on the server computer system based at least in part on the placement algorithm and the diversity constraint; and
update the database based at least in part on the placement information to indicate that the server computer system is associated with a logical partition of the first set of logical partitions.

6. The system of claim 5, wherein the request indicates the logical partition of the first set of logical partitions to execute the compute instance within and the server computer system is selected from a subset of server computer systems of the first set of server computer systems, the subset of server computer systems participating in the logical partition.

7. The system of claim 5, wherein the request indicates a new logical partition in the first set of logical partitions is to be created to execute the compute instance.

8. The system of claim 5, wherein the placement strategy causes a group of compute instances associated with the entity to be distributed among a number of server computer systems of the first set of server computer systems such that the number of server computer systems is minimized.

9. The system of claim 5, wherein the computer-executable instructions that cause the system to update the placement information based at least in part on the server computer system further comprise computer-executable instructions that, as a result of being executed, cause the system to associate the logical partition of the first set of logical partitions with the server computer system.

10. The system of claim 5, wherein the diversity constraint indicates that power systems are not to be shared between server computer systems of distinct logical partitions.

11. The system of claim 5, wherein the diversity constraint indicates a type of storage device to be included in the first set of logical partitions and not to be shared between a pair of logical partitions.

12. The system of claim 5, wherein the diversity constraint indicates a physical location is not to be shared between a pair of logical partitions.

13. A non-transitory computer-readable storage medium having stored thereon executable instructions that, as a result of being executed by one or more processors of a computer system, cause the computer system to at least:
obtain a request generated based at least in part on an interaction with an interface from a device associated with an entity, the request indicating a set of logical partitions of a computing environment for placement of a compute instance, a diversity constraint, and a placement strategy defining placement of compute instances among the set of logical partitions, where the diversity constraint comprises even distribution or clustered distribution;
determine to launch the compute instance within the set of logical partitions in the computing environment associated with the entity associated with the request;
select, by a service of a computing resource service provider, a server computer system based at least in part on the placement strategy associated with the entity and placement information obtained from a database that indicates a set of other compute instances associated with the entity in the set of logical partitions implemented by a set of server computer systems that is associated with the computing environment, and the diversity constraint including a set of conditions that indicate restrictions on a set of hardware devices associated with the server computer system and the set of server computer systems;
cause the server computer system to launch the compute instance based at least in part on the placement strategy and the diversity constraint; and
update the database based at least in part on the placement information to indicate membership of the server computer system in a logical partition of the set of logical partitions, the logical partition supported by a plurality of servers of the set of server computer systems.

14. The non-transitory computer-readable storage medium of claim 13, wherein the instructions cause the computer system to further comprise instructions that, as a result of being executed by the one or more processors, cause the computer system to update the placement information to indicate the server computer system is associated with the logical partition of the set of logical partitions.

15. The non-transitory computer-readable storage medium of claim 14, wherein the instructions further comprise instructions that, as a result of being executed by the one or more processors, cause the computer system to:
receive a second request to instantiate a second compute instance in the logical partition; and cause the compute instance to be instantiated by the server computer system based at least in part on the placement strategy.

16. The non-transitory computer-readable storage medium of claim 15, wherein the instructions further comprise instructions that, as a result of being executed by the one or more processors, cause the computer system to transmit a notification to the entity associated with the compute instance as a result of causing the second compute instance to be instantiated by the server computer system causing a pair of logical partitions to contain a number of compute instances that violate a condition of the set of conditions, where the condition indicates the number of compute instances that may be included in a particular logical partition.

17. The non-transitory computer-readable storage medium of claim 13, wherein the instructions further comprise instructions that, as a result of being executed by the one or more processors, cause the computer system to:
   receive a second request to move the compute instance to a second logical partition;
   select a second server computer system to include in the second logical partition;
   cause the compute instance to be migrated to the second server computer system; and
   update the placement information to indicate the second server computer system is associated with the second logical partition.

18. The non-transitory computer-readable storage medium of claim 13, wherein the instructions further comprise instructions that, as a result of being executed by the one or more processors, cause the computer system to:
   suspend execution of a particular compute instance associated with a particular logical partition; and
   resume the particular compute instance by at least restarting execution of the particular compute instance within the particular logical partition.

19. The non-transitory computer-readable storage medium of claim 18, wherein the instructions further comprise instructions that, as a result of being executed by the one or more processors, cause the computer system to:
   determine at least one compute instance associated with a first logical partition of the set of logical partitions to move to a second logical partition of the set of logical partitions based at least in part on a distribution pattern; and
   cause the at least one compute instance to be moved to a second server computer system.

20. The non-transitory computer-readable storage medium of claim 13, wherein the instructions further comprise instructions that, as a result of being executed by the one or more processors, cause the computer system to receive a second request to instantiate the compute instance, the second request indicating an auto-scaling group associated with a group of compute instances of which the compute instance is a member.

\* \* \* \* \*